(12) United States Patent
Onodera et al.

(10) Patent No.: US 6,708,484 B2
(45) Date of Patent: Mar. 23, 2004

(54) EXHAUST GAS PURIFYING SYSTEM

(75) Inventors: Hitoshi Onodera, Kanagawa-ken (JP); Masahiro Takaya, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/114,222

(22) Filed: Apr. 3, 2002

(65) Prior Publication Data

US 2002/0139112 A1 Oct. 3, 2002

(30) Foreign Application Priority Data

Apr. 3, 2001 (JP) .......................................... 2001-104391
Mar. 13, 2002 (JP) .......................................... 2002-068817

(51) Int. Cl.$^7$ ................................................ F01N 3/00
(52) U.S. Cl. .............................. 60/286; 60/274; 60/299; 60/300; 60/301; 422/171; 422/172; 422/177
(58) Field of Search ..................... 60/274, 286, 299, 60/300, 301, 303; 422/171–179, 169

(56) References Cited

U.S. PATENT DOCUMENTS

| | | |
|---|---|---|
| 3,986,350 A | 10/1976 | Schmidt |
| 4,149,998 A | 4/1979 | Tauster et al. |
| 5,124,303 A | 6/1992 | Kobayashi et al. |
| 5,272,871 A | 12/1993 | Oshima et al. |
| 5,412,946 A | 5/1995 | Oshima et al. |
| 5,473,887 A | 12/1995 | Takeshima et al. |
| 5,498,487 A | 3/1996 | Ruka et al. |
| 5,538,697 A * | 7/1996 | Abe et al. .................... 422/171 |
| 5,543,124 A * | 8/1996 | Yokota et al. ........... 423/239.1 |
| 5,814,576 A | 9/1998 | Yamamoto |
| 5,884,473 A * | 3/1999 | Noda et al. ..................... 60/274 |
| 5,921,076 A * | 7/1999 | Krutzsch et al. ............... 60/274 |
| 6,047,544 A | 4/2000 | Yamamoto et al. |
| 6,122,909 A | 9/2000 | Murphy et al. |

(List continued on next page.)

FOREIGN PATENT DOCUMENTS

| | | |
|---|---|---|
| EP | 0 778 072 A2 | 6/1997 |
| EP | 1 068 892 A2 | 1/2001 |
| GB | 988244 | 4/1965 |
| JP | 2600492 | 1/1997 |
| JP | 2000-117593 | 4/2000 |
| JP | 2000-257417 A | 9/2000 |
| WO | WO 00/53903 A1 | 9/2000 |

OTHER PUBLICATIONS

U.S. patent application Ser. No. 09/692,470, Yamamoto et al., filed Oct. 20, 2000.
Toyoda, Kenji et al., *Science and Technology in Catalysis 1998*, "The Quantitative Analysis of Multi–reactions on SCR Process", 1 page, (1998).
Ogura, Masaru et al., *Third Tokyo Conference on Advanced Catalytic Science and Technology*, "Selective Catalytic Reduction of Nitric Oxide with Methane on Pd/Co/H–ZSM–5 Catalysts", p. 49, (1998).
"New Automotive Gasoline Engine", Sankaido, p. 103, (6 sheets), (1994).
"Catalyst Lectureship: Industrial Catalyst Reaction II, Kodansha", pp. 193 and 194, (7 sheets), (1985).
Shin'ichi Matsumoto et al., *National Symposium Nano–Control of Environmental Catalysts and Related Materials (6$^{th}$ Iketani Conference)*, "Nox storage catalyst (NSR catalyst) for automotive lean burn engines", pp. 74 and 75, (Tokyo 1996).

*Primary Examiner*—Binh Tran
(74) *Attorney, Agent, or Firm*—Foley & Lardner

(57) ABSTRACT

An exhaust gas purifying system for a vehicle includes a hydrogen enriching device that increases a component ratio of hydrogen with respect to reducing gas components in exhaust gas, a NOx treating catalyst and a HC trap catalyst. The hydrogen enriching device, the NOx treating catalyst and the NOx treating catalyst are arrayed in this order in the exhaust gas passageway.

18 Claims, 6 Drawing Sheets

U.S. PATENT DOCUMENTS

| | | |
|---|---|---|
| 6,151,547 A | 11/2000 | Kumar et al. |
| 6,165,633 A | 12/2000 | Negishi |
| 6,173,571 B1 | 1/2001 | Kaneko et al. |
| 6,176,078 B1 | 1/2001 | Balko et al. |
| 6,185,933 B1 | 2/2001 | Tsuzuki et al. |
| 6,235,254 B1 * | 5/2001 | Murphy et al. .............. 423/212 |
| 6,244,044 B1 | 6/2001 | Bartley |

* cited by examiner

A : USE OF GASOLINE
B : USE OF LIGHT OIL
C : USE OF LIGHT OIL
(AFTER PASSING THROUGH HC/CO
SELECTIVE OXIDATION CATALYST)

EXHAUST GAS PURIFYING SYSTEM

BACKGROUND OF THE INVENTION

1. Field of the Invention

The present invention relates to a system for purifying exhaust gas containing nitrogen oxides (NOx), which is emitted from an internal combustion engine from a mobile body, particularly from a vehicle.

2. Description of the Related Art

In order to purify carbon monoxide (CO), hydrocarbons (HC), nitrogen oxides (NOx) and the like, which are contained in exhaust gas emitted from an internal combustion engine of a mobile body such a vehicle, a three-way catalyst functioning under a stoichiometric air-fuel ratio and an exhaust gas purifying system using the same have been used.

Meanwhile, a lean burn engine causing combustion in an air-fuel ratio range higher than the stoichiometric air-fuel ratio for improving fuel efficiency has been put into practical use. As a device for purifying emitted nitrogen oxides (NOx) under a lean burn condition, a NOx treating catalyst having a function of trapping NOx has been used. The NOx treating catalyst for lean burn includes a NOx trap agent (NOx adsorbent) as well as a catalyst for reducing and treating NOx. The NOx treating catalyst traps NOx in the trap agent when the air-fuel ratio is lean (i. e. a fuel ratio is low), and reduces the trapped NOx with reducing gas components in the exhaust gas when the air-fuel ratio is rich (i. e. a fuel ratio is high). Specifically, in this NOx treating catalyst, when the air-fuel ratio is rich, the reducing gas components such as hydrocarbons (HC), carbon monoxide (CO) and hydrogen ($H_2$), which are emitted from the internal combustion engine, are supplied to the NOx reducing/treating catalyst, and NOx is treated by a reduction reaction to be discharged as $N_2$. Note that a reduction function of each reduction gas depends on a temperature condition. In order to allow HC and CO to exert an excellent reduction function in a treatment reaction of NOx, a temperature condition of 250° C. or higher is required.

SUMMARY OF THE INVENTION

However, in general, an exhaust gas temperature under the lean burn condition is low, and it is difficult for the exhaust gas temperature to reach the temperature of 250° C. or higher where HC and CO exert the excellent reduction function for treating NOx. Particularly, since an exhaust gas temperature at the time of engine start, which is called a cold range, is a temperature ranging from 180 to 200° C., the reduction/treatment of NOx by means of the NOx treating catalyst cannot be performed efficiently.

Moreover, in the case of a vehicle using a diesel engine, since the exhaust gas temperature is further lowered, reduction/treatment efficiency of the NOx treating catalyst is deteriorated more.

Meanwhile, objects of exhaust gas control for a vehicle include not only NOx but also HC gas. As described above, when the exhaust gas temperature is low and HC and CO in the exhaust gas are not used for the reduction reaction in the NOx treating catalyst, HC and CO are not consumed by the NOx treating catalyst and flow out to the outside as exhaust gas.

Note that, for a problem about flowing out of HC at a low temperature in the lean burn internal combustion engine, the Japanese Patent Laid-Open publication No. 2000-257417 discloses an exhaust purifying apparatus, in which a HC trap agent for trapping HC of a high carbon number and an oxidation catalyst for treating HC of a low carbon number are disposed downstream of the NOx treating catalyst.

However, in the above-described exhaust purifying apparatus, NOx treatment is not performed at a low temperature but performed by raising a temperature. By such a raised temperature, HC trapped in the downstream HC trap agent is also treated. Specifically, in this apparatus, since a heating device is always used, an increase in fuel consumption is brought. Therefore, good fuel efficiency that is the important advantage given by lean burn cannot be obtained.

An object of the present invention is to provide a purifying system for a vehicle, which is capable of treating NOx and HC in exhaust gas more efficiently under the lean burn condition.

In order to achieve the object, an exhaust gas purifying system for a vehicle according to an aspect of the present invention includes a hydrogen enriching device that increases component ratio of hydrogen with respect to reducing gas components in exhaust gas, the hydrogen enriching device being disposed in an exhaust gas passageway, a NOx treating catalyst disposed downstream of the hydrogen enriching device in the exhaust gas passageway, and a HC trap catalyst disposed downstream of the NOx treating catalyst in the exhaust gas passageway. Note that, the exhaust gas flows from the hydrogen enriching device direct to the NOx treating catalyst continuously during operation.

DESCRIPTION OF THE PREFERRED EMBODIMENTS

The inventors of the present invention have made various examinations regarding NOx treatment at a low temperature lower than 250° C. Based on these examinations, the inventors of the present invention have proposed an exhaust gas purifying system effectively using hydrogen for the NOx treatment, which is disclosed in U. S. patent application Ser. No. 09/692,470. This exhaust gas purifying system includes a hydrogen enriching device disposed upstream of a NOx treating catalyst in an exhaust gas passageway.

The hydrogen enriching device placed upstream of the NOx treating catalyst produces hydrogen or selectively oxidizes reducing gas other than hydrogen, thus increasing relative hydrogen concentration in the exhaust gas flowing to the NOx treating catalyst. Since hydrogen can exert a high reduction function even at the low temperature lower than 250° C., NOx trapped in the NOx treating catalyst can be reduced and discharged efficiently. By use of this purifying system, NOx treatment is made possible even when an exhaust gas temperature is in the cold range, which has been conceived as impossible heretofore.

However, as a result of further examinations made by the inventors of the present invention, it has been found out that a part of HC does not participate in reactions in the hydrogen enriching device and the NOx treating catalyst and flows out to the atmosphere at a low temperature even in the above-described exhaust gas purifying system, and that it is necessary to decrease concentration of such HC flowing out to the atmosphere.

An exhaust gas purifying system according to an embodiment of the present invention is obtained by improving the above-described purifying system. The exhaust gas purifying system according to the embodiment is a purifying system for a vehicle, which is capable of treating not only NOx but also HC in exhaust gas emitted from an internal combustion engine more efficiently under the lean burn condition. Hereinafter, description will be made concretely for the exhaust gas purifying system.

Note that, in this specification, "%" represents mass percent, unless cited otherwise.

Figure 1A:
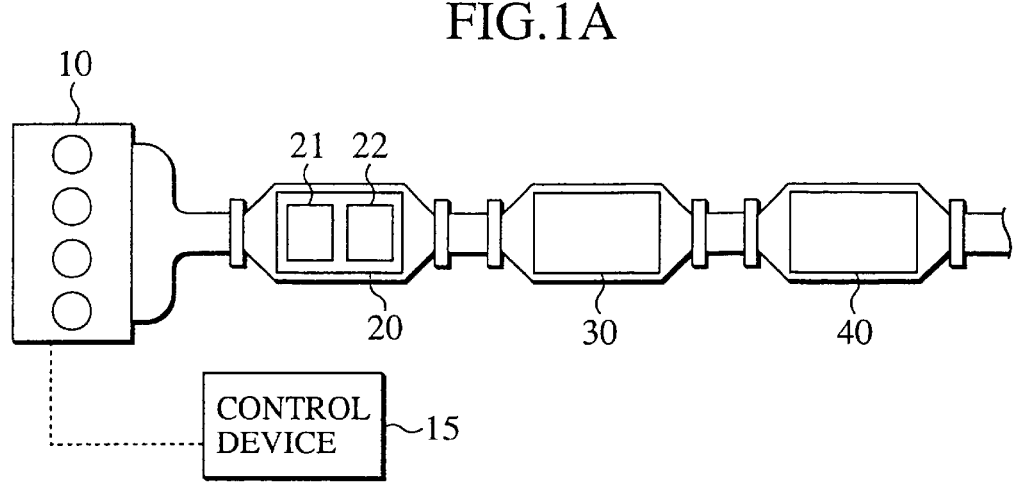
FIG. 1A is a constitutional view of an exhaust gas purifying system including a hydrogen enriching device, a NOx treating catalyst and a HC trap catalyst according to an embodiment of the present invention.
Figure 1B:
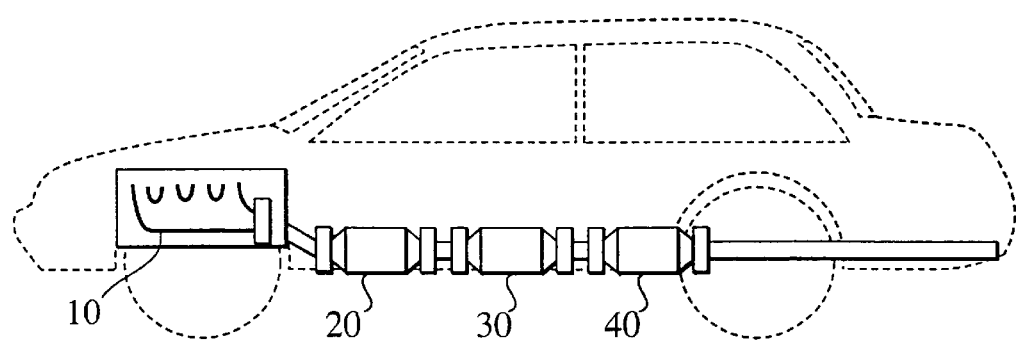
FIG. 1B is a view showing the exhaust gas purifying system amounted in a body of a vehicle.

First, as shown in FIG. 1A, in the exhaust gas purifying system of this embodiment, a hydrogen enriching device 20, a NOx treating catalyst 30 and a HC trap catalyst 40 are arrayed in this order in an exhaust gas passageway from an engine 10 in an in-line manner. FIG. 1B shows a view of the exhaust gas purifying system amounted in a body of a vehicle. The hydrogen enriching device 20 is always exposed to the exhaust gas flow and is disposed in the exhaust gas passageway or in a combustion gas passageway. Therefore, in this exhaust gas purifying system, it is not necessary to provide a by-pass for circulating the exhaust gas, to provide a switching valve for changing the exhaust gas way, or to supply hydrogen gas from an external of the exhaust gas passageway. This exhaust gas purifying system is more compact and is having a high performance, thus being suitable for a vehicle. Note that, with regard to the engine 10, a fuel injection condition and the like are controlled by means of a control device 15 in accordance with an operating state, and a state occurs, in which an air-fuel ratio is lean or rich.

First, description will be made generally for the hydrogen enriching device 20. The hydrogen enriching device is a device for increasing a component ratio of hydrogen with respect to reducing gas components in combustion gas and/or exhaust gas. Specifically, the hydrogen enriching device corresponds to (a) a device for producing hydrogen in combustion gas and/or exhaust gas or (b) a device for decreasing reducing components other than hydrogen in combustion gas and/or exhaust gas. Note that as the hydrogen enriching device, one of the above-described devices (a) and (b) or both thereof may be used.

Concretely, the above-described hydrogen producing device (a) is a device for producing hydrogen in combustion gas and/or exhaust gas, increasing an amount of hydrogen, and thus increasing hydrogen concentration positively. There can be exemplified a combustion control device (combustion system) for fuel injection timing, ignition timing and the like, and a hydrogen producing catalyst (catalyst system) containing noble metals such as rhodium (Rh).

Moreover, the above-described reducing component decreasing device (b) is a device for decreasing reducing components such as HC and CO selectively (or superiorly to hydrogen), and thus increasing hydrogen concentration in the gas. There can be exemplified a CO/HC selective oxidation catalyst, a catalyst containing solid acidic oxide decreasing a consumption ratio of hydrogen more than consumption ratios of other gas components, and the like.

Figure 2:
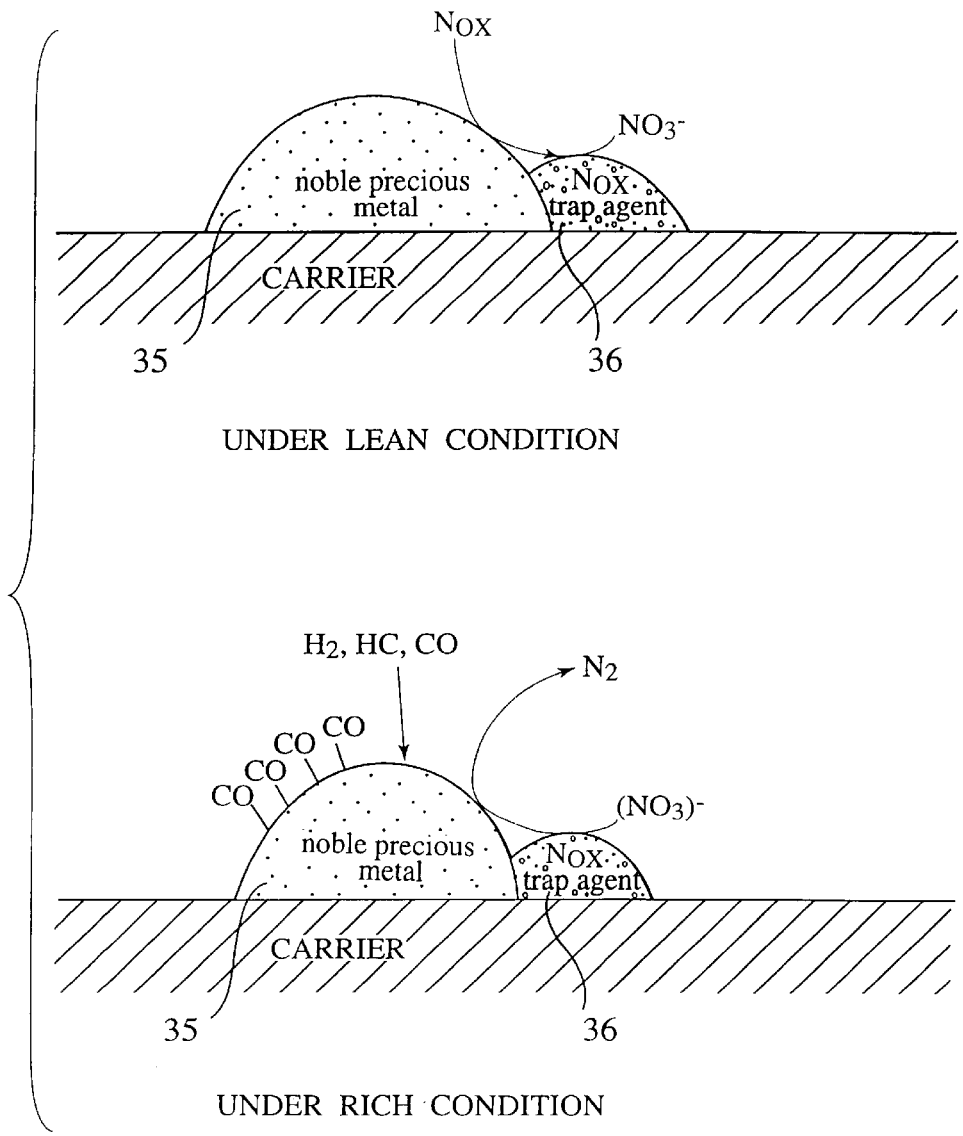
FIG. 2 is a view illustrating a mechanism of NOx treatment in the NOx treating catalyst according to the embodiment of the present invention.

FIG. 2 is a view for explaining a purifying mechanism in the NOx treating catalyst 30 of NOx trap type. The NOx treating catalyst 30 includes a noble metal catalyst 35 such as platinum (Pt) and Rh, which is a NOx reducing and treating catalyst, and an adsorbent 36 such as barium (Ba), which traps NOx as nitrate. NOx is trapped in the adsorbent 36 when the air-fuel ratio is lean, and the trapped NOx is reduced and treated in the noble metal catalyst 35 by reducing gas in exhaust gas and then discharged as N2 when the air-fuel ratio becomes rich.

The reducing components such as HC and CO other than hydrogen, which are contained in exhaust gas, exert a reducing function under a temperature condition ranging from 250° C. to 500° C. However, the reducing components do not exert the reducing function at a low temperature lower than 250° C. as a temperature of exhaust gas emitted under the lean burn condition. Moreover, as shown in FIG. 2, at the temperature lower than 250° C., particularly, the CO gas tends to be adhered on the surface of the NOx treating catalyst 35, thus disturbing a treatment reaction of NOx.

Meanwhile, hydrogen exerts the reduction function even at a low temperature of 200° C. or lower, that is, a temperature in the cold range. Therefore, if the amount of hydrogen in exhaust gas is increased, the treatment reaction of NOx by means of the NOx treating catalyst 30 is promoted. Also when the reducing components (HC and CO) other than hydrogen in the exhaust gas are decreased to increase the relative hydrogen concentration, the treatment reaction by use of hydrogen is promoted. Because the amount of CO or the like disturbing the treatment reaction is decreased.

Specifically, when the NOx treating catalyst of this embodiment performs NOx treatment, it is preferable that hydrogen enriching be executed by means of the above-described hydrogen enriching device and that the hydrogen concentration [H2] and the total reducing component concentration [TR] in the exhaust gas satisfy the following formula (f1) and (f2):

$$[H2/TR]d > [H2/TR]u \quad (f1)$$

$$[H2/TR]d \geq 0.3 \quad (f2)$$

where [H2/TR]u is a ratio between the hydrogen concentration [H2]u and the total reducing component concentration [TR]u prior to the execution of hydrogen enriching by the above-described hydrogen enriching device or in the upper stream thereof, and [H2/TR]d is a ratio between the hydrogen concentration [H2]d and the total reducing component concentration [TR]d at the inlet to the above-described NOx treating catalyst.

When the above-described formula (f1) and (f2) are satisfied, hydrogen is effectively utilized as the reducing component in the treatment reaction of NOx, and thus NOx is treated efficiently.

According to study by the inventors, when exhaust gas purifying system or catalyst for purifying exhaust gas is utilized without the hydrogen enriching device, [H2/TR]d is less than 0.3. Therefore when the above formula (f2) is satisfied, it is possible to get an improved treating effect by using this hydrogen enriching device. It is preferable that [H2/TR]d is 0.5 or more. For safety, the hydrogen content should be less than 4% to the total exhaust gas.

Note that the hydrogen enriching device described above can always execute hydrogen enriching, however, it is desirable to match an execution time of the hydrogen enriching with a treatment time of NOx by means of the NOx treating catalyst from a viewpoint of enhancing treatment efficiency of NOx.

Furthermore, in the purifying system of this embodiment, a ratio between the hydrogen concentration [H2]d and carbon monoxide concentration [CO]d in the total reducing component concentration [TR]d at the inlet to the NOx treating catalyst during the treatment of NOx should satisfy the following formula (f3):

$$[H2/CO]d > 1 \tag{f3}$$

When the formula (f3) is satisfied, in reducing gas, particularly, the concentration of CO is decreased, which has a high tendency to be adhered on the surface of the NOx treating catalyst and to disturb the treatment reaction between NOx and hydrogen. Therefore, it is made possible to enhance reactivity between $H_2$ having strong reduction power and NOx and thus to further improve the treatment efficiency of NOx.

Figure 3:
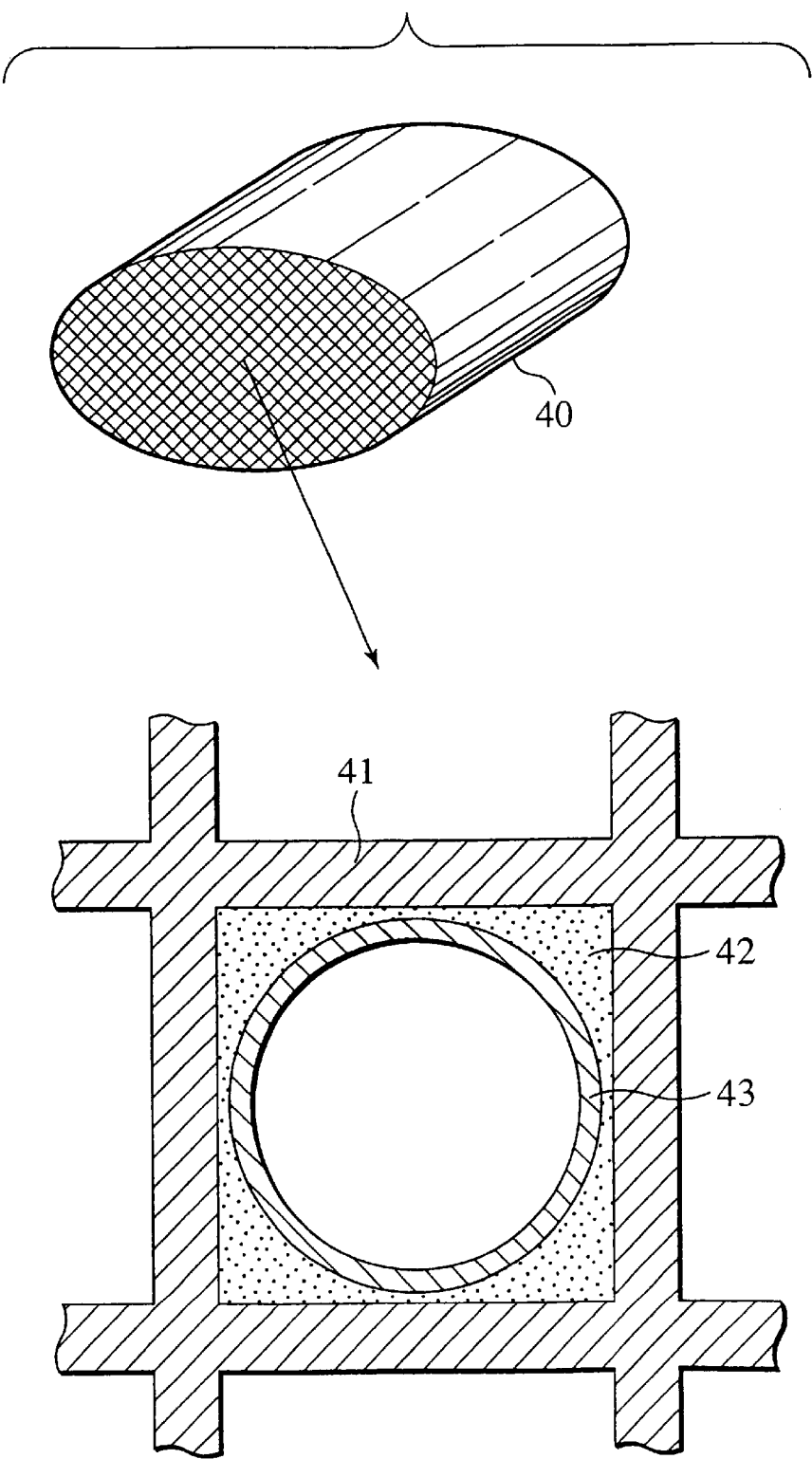
FIG. 3 is an external view and a partially enlarged sectional view, both showing one example of the HC trap catalyst according to the embodiment of the present invention.

Next, description will be made for the HC trap catalyst 40 according to this embodiment. FIG. 3 is an external view and a partial sectional view, both showing structure of the HC trap catalyst 40 according to this embodiment.

As shown in FIG. 1A, in the exhaust gas purifying system according to this embodiment, the HC trap catalyst 40 is disposed downstream of the NOx treating catalyst described above.

The HC trap catalyst 40 contains an adsorbent capable of adsorbing HC at a low temperature and of discharging HC as the temperature rises (when the temperature reaches an activation temperature). The HC trap catalyst 40 traps HC, which is not consumed in the NOx treating catalyst and remains in exhaust gas. The discharged HC is treated by means of a three-way catalyst provided monolithically with the HC trap catalyst 40 or a three-way catalyst provided separately from the HC trap catalyst 40.

Note that, though a HC treating catalyst such as a three-way catalyst may be provided separately from the HC trap catalyst, with a structure including a HC adsorbent layer and the HC treating catalyst in the HC trap catalyst itself, HC can be discharged and treated more efficiently.

For example, as shown in FIG. 3, the HC trap catalyst of this embodiment is formed in such a manner that hydrocarbon adsorbing layers 42 and metal catalyst layers 43 as three-way catalysts are stacked on a monolithic carrier 41 having a plurality of cells, each having a polygonal cross section. The exhaust gas passes through the center of the cell inside the metal catalyst layer 43. As the monolithic carrier 41, for example, the one made of ceramics such as cordierite and the one made of metal such as ferrite stainless steel can be used.

As a hydrocarbon adsorbent of the hydrocarbon adsorbing layers 42, zeolite or active carbon can be used. Moreover, as a metal catalyst material of the metal catalyst layers 43, a metal having a so-called three-way catalyst function, such as Pd, Pt and Rh, can be used. Note that, when zeolite is used as a hydrocarbon adsorbent, it is desirable not to contain a metal catalyst in a zeolite layer in order to enhance durability thereof.

As described above, in the exhaust gas purifying system according to this embodiment, the hydrogen enriching device is disposed upstream of the NOx treating catalyst, and the HC trap catalyst is disposed downstream of the NOx treating catalyst. Therefore, the treatment reaction of NOx can be promoted efficiently. Moreover, HC, which is not used in the treatment reaction of NOx and remains in the exhaust gas, is trapped by means of the HC trap catalyst, thus making it possible to prevent HC to flow out to the atmosphere. Specifically, flowing out of HC, which occurs in the cold range, can be suppressed.

Note that, a material type of the hydrocarbon adsorbing layer 42 in the HC trap catalyst 40 is preferably selected according to a fuel type used in an objective internal combustion engine.

Figure 4:
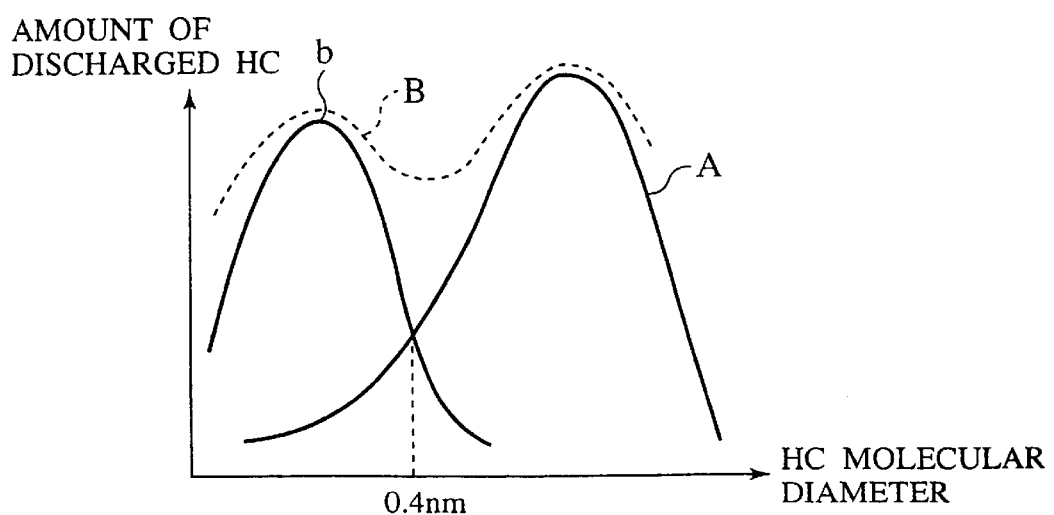
FIG. 4 is a view showing distribution of molecular diameters of HC contained in exhaust gas.

FIG. 4 is a graph showing distribution of molecular diameters of HC contained in exhaust gas. In FIG. 4, the line A indicates molecular diameters in the case of a gasoline vehicle using gasoline fuel, and the line B indicates molecular diameters in the case of a diesel vehicle using light oil fuel.

As referring to the line A in FIG. 4, when the fuel is light quality oil such as gasoline, HC having carbon numbers of 3 or more and molecular diameters of 4 Å (0.4 nm) or larger is contained much in untreated HC. As a hydrocarbon adsorbent for such HC, it is preferable to use, ZSM-5 or the like, which efficiently adsorbs such HC having the above-described molecular diameters. Note that, since an average molecular diameter of HC to be adsorbed and a pore diameter of zeolite correlate with each other, it is preferable to use zeolite having a pore diameter equivalent to the molecular diameter of HC to be adsorbed or larger.

Meanwhile, as referring to the line B in FIG. 4, when the fuel is heavy quality oil such as light oil, in exhaust gas, contained are various types of HC from the one having a carbon number smaller than 3 and a molecular diameter smaller than 4 Å to the one having a carbon number of 3 or more and a molecular diameter of 4 Å or larger. Hence, as a hydrocarbon adsorbent, besides β-zeolite or ZSM-5, which can efficiently adsorb HC having the molecular diameters of 4 Å (0.4 nm) or larger, it is preferable to use ferrierite, A type-zeolite or B-type zeolite or the like, which can efficiently adsorb HC having the molecular diameters smaller than 4 Å (0.4 nm).

The HC trap catalyst is disposed downstream of the hydrogen enriching device and the NOx treating catalyst. When the CO/HC selective oxidation catalyst is used as a hydrogen enriching device, HC having the carbon numbers of 3 or more and the molecular diameters of 4 Å or larger is oxidized and treated by means of the CO/HC selective oxidation catalyst. Therefore, as in the diesel vehicle, when the light oil is used as fuel and when the CO/HC selective oxidation catalyst is used as a hydrogen enriching device, as indicated by a line b of FIG. 4, HC having the carbon numbers smaller than 3 and the molecular diameters smaller than 4 Å (0.4 nm) is mainly contained in exhaust gas having passed through the catalyst. Hence, in this case, as a hydrocarbon adsorbent, it is preferable to use ferrierite, A type-zeolite or B-type zeolite or the like, which can efficiently adsorb HC having the molecular diameters smaller than 4 Å (0.4 nm).

Note that, since methane ($CH_4$) is not included in exhaust gases to be controlled, the above-described HC trap catalyst for trapping hydrocarbons may be the one capable of trapping at least molecules larger than those of $CH_4$. In other words, the HC trap catalyst may be the one capable of mainly trapping HC having a boiling point of −50° C. or higher.

As described above, in the exhaust gas purifying system according to this embodiment, a specified hydrogen enriching device is disposed upstream of the NOx treating catalyst disposed in the exhaust gas passageway, the HC trap catalyst is disposed downstream of the NOx treating catalyst, and by means of the hydrogen enriching device, hydrogen-enriched combustion gas and exhaust gas are supplied to the NOx treating catalyst. Therefore, the treatment of NOx is performed efficiently, and by means of the HC trap catalyst, flowing out of HC to the atmosphere in the cold range can be previously prevented.

Again, description will be made in further detail for the hydrogen enriching device according to this embodiment.

As described above, the hydrogen enriching device is broadly classified into (a) the hydrogen producing device and (b) the device for decreasing reducing components other than hydrogen. Furthermore, as (a) the hydrogen producing device, enumerated are (I) a combustion control device (combustion system) and (II) a hydrogen producing catalyst (catalyst system). Moreover, as (b) the device for decreasing reducing components other than hydrogen, enumerated are (III) a CO/HC selective oxidation catalyst (catalyst system) and (IV) a solid acidic oxide-containing catalyst (catalyst system). The devices described above are not completely classified, and in some cases, one catalyst has a plurality of catalyst functions. Moreover, the devices (I) to (IV) can be used singly or in combination of two or more thereamong. As a preferred structure of the hydrogen enriching device, enumerated is a combination of the combustion control device (I), the hydrogen producing catalyst (II), the HC/CO selective oxidation catalyst (III) and the solid acidic oxide-containing catalyst (IV).

Concretely, as the combustion control device (I), there can be enumerated a device for controlling a fuel injection amount, fuel injection timing, ignition timing or open/close timing of intake/exhaust valves and any combination thereof. Moreover, the combustion control device includes a device for subjecting mainly HC to partial oxidation in the combustion gas and/or the exhaust gas and for producing CO.

It is satisfactory if the hydrogen producing catalyst (II) is a catalyst having a function of producing hydrogen from HC and CO in the combustion gas and/or the exhaust gas. As the hydrogen producing catalyst, noble metal catalysts containing noble metals such as Pt, Pd and Rh and any mixture thereof can be exemplified. Among the hydrogen producing catalysts described above, a catalyst containing Rh is the most preferable as the one using single noble metal.

The CO/HC selective oxidation catalyst (III) has an effect of decreasing the reducing components other than $H_2$. For example, as such a catalyst, a catalyst containing zirconium oxide, which has a $H_2$ producing function as well, can be enumerated. In this case, it is preferable that zirconium oxide contains an alkaline earth metal, and that composition thereof is represented by the following general formula (f4):

$$[X]_a Zr_b O_c \quad (f4)$$

where X in the formula is at least one type of alkaline earth metals selected from the group consisting of magnesium, calcium, strontium and barium, a and b are atomic ratios of the respective elements, and c is the number of oxygen atoms required for satisfying valences of X and Zr, in which the following relations are satisfied:

a=0.01 to 0.5 b=0.5 to 0.99

$a+b=1$

In the above formula (f4), if a is smaller than 0.01, then a reforming effect of the added element (alkaline earth metal) on zirconium oxide is not obtained sufficiently. On the contrary, if a exceeds 0.5, then heat resistance of the catalyst is deteriorated and activity thereof is lowered in some cases. Moreover, if a+b exceeds 1.0, then a structural stability of zirconium oxide is lowered sometimes, which is not preferable.

As described above, the CO/HC selective oxidation catalyst formed of zirconium oxide can be used together with the hydrogen producing catalyst, preferably Rh, whereby an electron condition of Rh is maintained suitable, so that $H_2$ is produced efficiently, thus making it possible to further promote hydrogen enriching.

In this case, it is desirable to set an amount of used Rh in a range from 0.01 to 10 g per liter (L) of the catalyst. If the amount of Rh is less than 0.01 g/L, an increasing effect for the component ratio of $H_2$ by Rh is not sufficiently obtained. On the contrary, if the amount of Rh exceeds 10 g/L, the increasing effect is saturated.

Note that, in such a case where the CO/HC selective oxidation catalyst is used together with the hydrogen producing catalyst, when a+b exceeds 1.0 in zirconium oxide represented by the above formula (f4), the added alkaline earth metal is deposited out to the surface of the catalyst to lower catalytic activity of Rh in some cases.

Moreover, the CO/HC selective oxidation catalyst described above can be made to contain Pd and cerium oxide in order to selectively oxidize and remove unburned HC and CO and thus to increase the component ratio of $H_2$. In this case, it is desirable to carry 20 to 80% of the total amount of Pd on the cerium oxide.

If an amount percent of Pd carried on cerium oxide is less than 20%, then the increasing effect for the component ratio of $H_2$ is not sufficiently obtained. On the contrary, if the amount percent exceeds 80%, then dispersibility of Pd is deteriorated, so that the catalytic activity is lowered.

Furthermore, it is desirable to set an amount of used Pd in a range from 0.01 to 50 g per liter (L) of the catalyst. If the amount of Pd is less than 0.01 g/L, an improvement effect, in which Pd selectively oxidizes and removes the unburned HC and CO to enhance the component ratio of $H_2$, is not sufficiently obtained. On the contrary, if the amount of Pd exceeds 50 g/L, the improvement effect is saturated.

Next, the solid acidic oxide-containing catalyst (IV) suppresses consumption of $H_2$. As the solid acidic oxide-containing catalyst (IV), a catalyst containing solid acidic zirconium oxide, which preferably has a CO/HC selective oxidation function as well, can be enumerated. As such solid acidic zirconium oxide, the one is desirable, which contains at least one type of elements selected from the group consisting of titanium, aluminum, tungsten, molybdenum and zinc, in which composition thereof is represented by the following general formula (f5):

$$[Y]_d Zr_e O_f \quad (f5)$$

where Y in the formula is at least one type of elements selected from the group consisting of titanium, aluminum, tungsten, molybdenum and zinc, d and e are atomic ratios of the respective elements, and f is the number of oxygen atoms required for satisfying valences of Y and Zr, in which the following relations are satisfied:

d=0.01 to 0.5 e=0.5 to 0.99

$d+e=1$

In the above formula (f5), if d is smaller than 0.01, a reforming effect of the added element such as titanium on zirconium oxide is not obtained sufficiently. On the contrary, if d exceeds 0.5, then heat resistance of the catalyst is deteriorated and activity thereof is lowered in some cases. Moreover, if d+e exceeds 1.0, a structural stability of zirconium oxide is sometimes lowered.

Moreover, the solid acidic oxide-containing catalyst (IV) can be used together with the hydrogen producing catalyst, particularly Pt, whereby $H_2$ in the composition gas having an enhanced component ratio of $H_2$ can be supplied to the NOx treating catalyst efficiently.

In this case, in order to suppress $H_2$ consumption by Pt, it is preferable to impregnate Pt on zirconium oxide represented by the above-described formula (f5), and it is desirable to support 10 to 30% of the total amount of Pt on this zirconium oxide. If an amount percent of Pt supported on the zirconium oxide is less than 10%, then a consumption suppressing effect for produced $H_2$ is not sufficiently obtained. On the contrary, if the amount percent exceeds 30%, then the suppressing effect is saturated.

Moreover, it is desirable to set an amount of used Pt in a range from 0.01 to 25 g per liter (L) of the catalyst. If the amount of Pt is less than 0.01 g/L, an improvement effect, in which Pt selectively oxidizes and removes the unburned HC and CO to enhance the component ratio of $H_2$, is not sufficiently obtained. On the contrary, if the amount of Pt exceeds 25 g/L, the improvement effect is saturated.

Note that, in such a case where the solid acidic oxide-containing catalyst (IV) is used together with the hydrogen producing catalyst, when d+e exceeds 1.0 in zirconium oxide represented by the above formula (f5), the added element such as titanium is deposited out to the surface of the catalyst to lower catalytic activity of Pt in some cases, which is not preferable.

Here, description will be made in detail for a catalytic structure of the catalyst in which the hydrogen producing catalyst is used together with the CO/HC selective oxidation catalyst or the like.

In the exhaust gas purifying system of this embodiment, with regard to the catalyst, in which the hydrogen producing catalyst as one example of the hydrogen enriching device is used together with other components, a catalyst constitution of monolithic structure type to be described below, which uses a monolithic carrier and the like, is preferably adopted. Specifically, in the above-described catalyst, the catalyst component for oxidizing HC and CO and decreasing oxygen is disposed upstream in the exhaust gas passageway, and the catalyst component for producing hydrogen is disposed downstream, thus an amount of oxygen brought into contact with the hydrogen producing catalyst component is decreased.

In the catalyst described above, in order to rapidly cope with conditional variation such as space velocity and temperature, it is preferable to use Pd and/or Pt as the catalyst component for oxidizing HC/CO and decreasing $O_2$ in the upper stream thereof. In this case, it is desirable to set contents of Pd and/or Pt at 0.1 to 50 g/L (/L: per catalyst volume). Note that alumina may be used as the support according to needs.

If the contents of Pd and/or Pt are less than 0.1 g/L, the catalytic activity is not obtained sufficiently in some cases. On the contrary, if the contents exceed 50 g/L, the catalytic activity is saturated.

Moreover, in order to produce $H_2$ from residual HC and CO efficiently, it is preferable to allow the catalyst to contain Rh and zirconium oxide as the downstream catalyst component for producing hydrogen.

In order to rapidly cope with the conditional variation such as space velocity and temperature, it is preferable to set the content of Rh in a range from 0.1 to 50 g/L and the content of zirconium oxide in a range from 10 to 300 g/L. Note that zirconium oxide is the one used as a support.

If the content of Rh is less than 0.1 g/L, the catalytic activity is not sufficiently obtained in some cases. On the contrary, if the content exceeds 50 g/L, the catalytic activity is saturated. Moreover, if the content of zirconium oxide is less than 5 g/L, a reforming effect in catalyst performance of rhodium is not sufficiently obtained. On the contrary, if the content exceeds 100 g/L, the catalytic activity is saturated.

Moreover, zirconium oxide containing an alkaline earth metal, which is represented by the above formula (f4), is used as zirconium oxide described above, and the electron condition of Rh is maintained suitable, thus $H_2$ can be produced efficiently.

Furthermore, as described above, Pd and cerium oxide are contained, and an electron condition of Pd is maintained suitable, thus enabling more efficient production of $H_2$ to be promoted.

In this case, it is preferable to set content of Pd in a range from 0.01 to 50 g/L and content of cerium oxide (support) in a range from 10 to 300 g/L. If the content of Pd is less than 0.1 g/L, the catalytic activity is not sufficiently obtained in some cases. On the contrary, if the content exceeds 50 g/L, the catalytic activity is saturated. Moreover, if the content of cerium oxide is less than 10 g/L, a reforming effect in catalyst performance of Pd is not sufficiently obtained in some cases. On the contrary, if the content of Pd exceeds 300 g/L, the catalytic activity is saturated.

Note that, in the exhaust gas purifying system of this embodiment, a variety of the hydrogen enriching devices described above may be combined from one another. Particularly, combination of the combustion control device (I) and the hydrogen enriching devices (II to IV) of the catalyst system is effective.

Specifically, the fuel injection amount, the fuel injection timing, the ignition timing or the open/close timing of the intake/exhaust valves and any combination thereof of the internal combustion engine are controlled by the above-described combustion control device. Moreover, combustion gas and exhaust gas, which flow into the hydrogen enriching device of the catalyst system, are regulated into an atmosphere where the reducing components such as hydrocarbons are excessive (into a rich range) such that a Z value thereof becomes 0.1 or smaller intermittently. Thus, the production effect of $H_2$ and the like are further improved, therefore, execution of composition control for gas regulated by the formulae (f1) to (f3) is facilitated.

Note that the Z value described above represents a stoichiometric ratio of an oxidizing agent and a reducing agent, which is defined by the following formula:

$$Z=([O_2]\times 2+[NO])/([H_2]\times 2+[CO]+[HC]\times \alpha)$$

where $[O_2]$, $[NO]$, $[H_2]$, $[CO]$ and $[HC]$ indicate concentrations of oxygen, nitrogen monoxide, hydrogen, carbon monoxide and hydrocarbons, respectively, and $\alpha$ indicates a coefficient determined depending on kinds of HC components.

Next, description will be made in detail for the NOx treating catalyst.

This NOx treating catalyst is disposed downstream the hydrogen enriching device which is described above. It is sufficient if the NOx treating catalyst can reduce NOx by means of the reducing components such as hydrogen, and the NOx treating catalyst is not particularly limited. However, the NOx treating catalyst is broadly classified into a NOx treating catalyst of NOx trap type and a NOx treating catalyst of selective reduction type. The NOx treating catalyst of NOx trap type contains a first component selected from the group consisting of alumina, an alkali metal, an alkaline earth metal and any mixture thereof and a second component selected from the group consisting of Pt, Pd, Rh and any mixture thereof. The NOx treating catalyst of selective reduction type contains a first component selected from the group consisting of copper (Cu), cobalt (Co), nickel (Ni), iron (Fe), gallium (Ga), lanthanum (La), cerium (Ce), zinc (Zn), titanium (Ti), calcium (Ca), barium (Ba), silver (Ag) and any mixture thereof and a second component selected from the group consisting of Pt, iridium (Ir), Rh and any mixture thereof.

As a catalyst capable of very efficiently using $H_2$ as the reducing component, the former NOx trap type catalyst is desirable, so in the exhaust gas purifying system according to this embodiment, the NOx trap type catalyst is used.

In this case, preferably, cesium is used as an alkali metal, and as an alkaline earth metal, magnesium (Mg), Ca, strontium (Sr) and/or Ba are used. It is preferable that such an alkali metal and an alkaline earth metal are then contained in amount ranging from 10 to 70 g/L (per liter of the catalyst), which is converted into oxide. If contents thereof are less than 10 g/L in total, then NOx treating performance is not sufficiently obtained. On the contrary, if the contents exceed 70 g/L, the NOx treating performance is lowered in some cases.

Moreover, it is preferable to set an amount of supported noble metals such as Pt and Rh in a range from 0.01 to 25 g/L. If the amount of supported noble metals is less than 0.01 g/L, the NOx treating performance is not sufficiently obtained in some cases. On the contrary, if the amount of supported noble metal exceeds 25 g/L, the catalytic activity is saturated.

In the NOx treating catalyst of NOx trap type as described above, as a method for supporting an alkali metal and an alkaline earth metal thereon, any method can be used, which includes an impregnation method using a solution of water-soluble salt such as acetate, a blending method of blending slightly soluble salt/insoluble salt such as carbonate and sulfate into a water-soluble slurry and the like.

Note that, as another example of the NOx treating catalyst, a catalyst containing at least Rh and having activation temperature in a range from 260 to 380° C. can be enumerated. By use of this catalyst, effective treatment of NOx in exhaust gas at a relatively low temperature can be realized.

Moreover, in a variety of catalysts, as a porous base material for supporting the catalyst component, the one selected from the group consisting of alumina, silica alumina, zeolite and any mixture thereof is suitable. Particularly, active alumina having a specific surface area in a range from about 50 to 300 $m^2/g$ is preferable.

Furthermore, a rare earth element and zirconium may be added to alumina for the purpose of increasing the specific surface area thereof. It is preferable to set an amount of used porous support in a range from 50 to 300 g per liter of the catalyst.

EXAMPLE

Hereinafter, description will be made for an example of the present invention.

In the exhaust gas purifying system of the example, as shown in FIG. 1A, the hydrogen enriching device 20, the NOx treating catalyst 30 and the HC trap catalyst 40 are disposed in the exhaust gas passageway coupled to the internal combustion engine 10. Moreover, as the hydrogen enriching device 20, a hydrogen producing-permeating catalyst 21 and a HC/CO selective oxidation catalyst 22 are arrayed in series for use.

Figure 5:
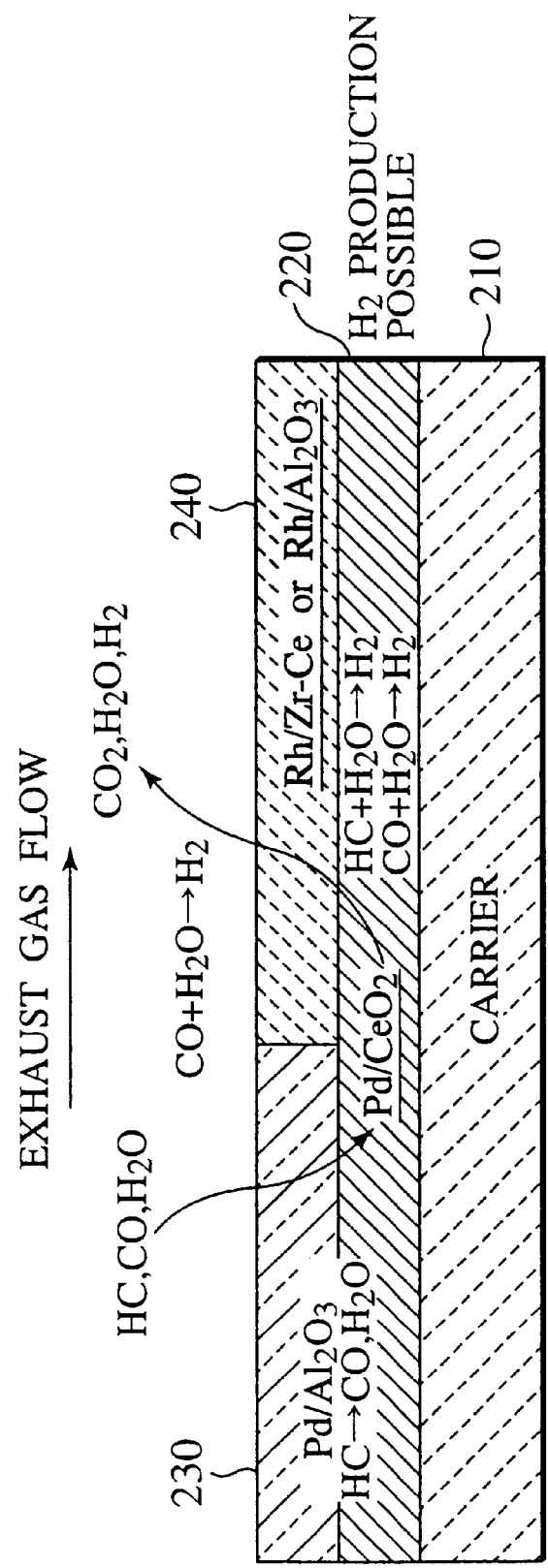
FIG. 5 is a view showing a constitutional example of hydrogen producing-permeating catalyst as one of the hydrogen enriching devices according to an example of the present invention.

Here, the hydrogen producing-permeating catalyst 21 is a catalyst of a structure combining the hydrogen producing catalyst (II), the CO/HC selective oxidation catalyst (III) and the solid acidic oxide-containing catalyst (IV). In FIG. 5, a structural example of the hydrogen producing-permeating catalyst 21 is shown. On a carrier 210, a hydrogen producing catalyst layer 220 containing Pd and cerium oxide is formed. Furthermore, in the upstream exhaust gas flow on the hydrogen producing catalyst layer 220, a CO/HC selective oxidation catalyst layer 230 containing Pd supported on alumina or the like is formed. In the downstream exhaust gas flow on the hydrogen producing catalyst layer 220, a solid acidic oxide-containing catalyst layer 240 having Rh supported on a zirconium oxide support containing alkaline earth metal is formed.

With regard to HC, CO and $H_2O$ in exhaust gas, HC is oxidized to produce CO in a process where HC, CO and $H_2O$ permeate the CO/HC selective oxidation catalyst layer 230. Furthermore, HC and CO are reacted with $H_2O$ to produce hydrogen when reaching the hydrogen producing catalyst layer 220. The produced hydrogen is discharged to the outside without being consumed by the solid acidic oxide-containing catalyst layer 240. As described above, the structure shows a function of producing hydrogen and permeating the produced hydrogen.

Note that a mass of HC and CO, which have not been consumed by the hydrogen producing-permeating catalyst 21, is oxidized and consumed by the next HC/CO selective oxidation catalyst 22.

The internal combustion engine 10 can perform lean burn, and for example, a lean burn engine, a direct injection engine, a diesel engine or the like is used. With regard to the engine 10, the fuel injection condition and the like are controlled by means of the control device 15 in accordance with an operating state, and the state will occur, in which the air-fuel ratio is lean or rich.

In the cold range where the exhaust gas temperature is low, among exhaust gas components produced when the air-fuel ratio of the internal combustion engine 10 is rich, a part of HC is partially oxidized by the $H_2$ producing-permeating catalyst 21 and the HC/CO selective oxidation catalyst 22 and flows into the NOx treating catalyst 30 disposed downstream thereof. The NOx treating catalyst 30 disposed downstream is a trap-type catalyst and has a function of trapping NOx emitted when the air-fuel ratio of the internal combustion engine 10 is lean.

In the cold range where the exhaust gas temperature is low, NOx trapped when the air-fuel ratio is lean is reduced and treated by $H_2$ flowing into the NOx treating catalyst 30 when the air-fuel ratio of the internal combustion engine 10 is rich.

In this case, since the exhaust gas temperature is low, HC flowing into the NOx treating catalyst 30 together with $H_2$ is not consumed as a reducing agent for treating and discharging NOx by the NOx treating catalyst 30 and passes through the NOx treating catalyst 30. HC having passed through the NOx treating catalyst 30 is trapped in a hydrocarbon adsorbent layer of the HC trap catalyst 40 disposed downstream the NOx treating catalyst 30. HC trapped in the HC trap catalyst 40 is discharged as the exhaust gas temperature rises and treated by a three-way catalyst layer formed on the hydrocarbon adsorbent layer.

In the HC trap catalyst 40, the HC adsorbent for trapping HC flowing thereinto is a porous substance, and for example, zeolite is used. In accordance with a molecular size of the HC component flowing into the HC trap catalyst 40, proper alteration of the above-described HC adsorbent to other trap agents different in porous size, that is, porous diameter can be made.

As described above, according to the exhaust gas purifying system, in the cold range where the exhaust gas temperature is low, it is made possible to prevent HC from flowing out to the atmosphere previously while treating NOx.

Figure 6A:
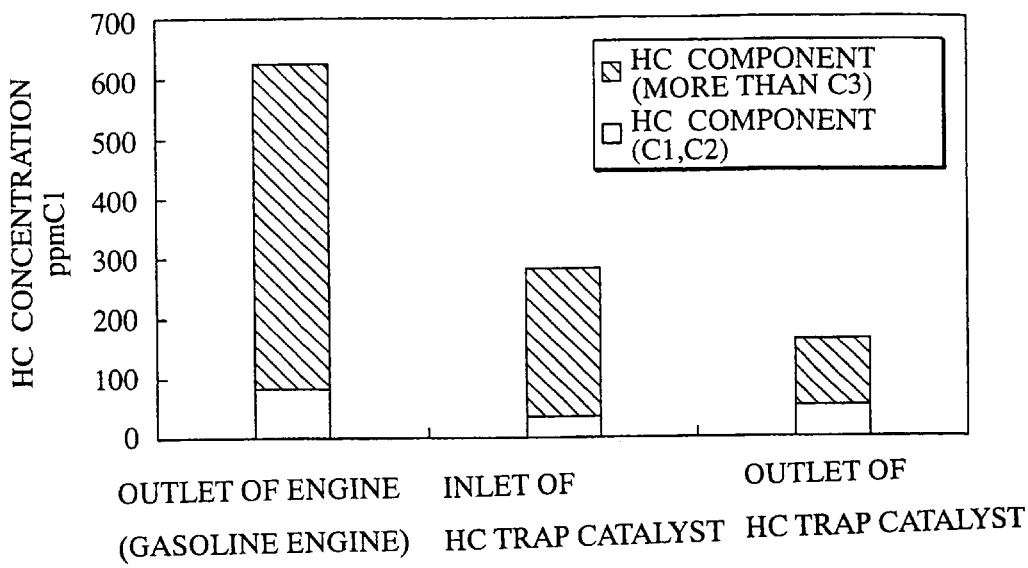
FIG. 6A is a graph showing HC concentration in exhaust gas at each concerned spot when a gasoline engine is used.

FIG. 6A shows one example of a HC trap characteristic in the case of using the exhaust gas purifying system of this example in a gasoline vehicle using the lean burn engine. Note that gasoline is used as fuel gas here.

As shown in FIG. 6A, HC components that have 3 or more carbon numbers (C numbers) occupy 86% of total HC components, which are generated in an internal combustion engine using gasoline as fuel. Also at the inlet to the HC trap catalyst 40, the HC components that have 3 or more C numbers occupy 82%. Therefore, in this case, in order to prevent HC from flowing out in the cold range previously, it will be necessary to decrease the HC components that have 3 or more C numbers.

Accordingly, in this example, β-zeolite which traps the HC components having 3 or more carbon numbers effectively is used as the adsorbent of the HC trap catalyst 40. As a result of this, as shown in FIG. 6A, 60% of HC can be decreased by means of the HC trap catalyst 40. Moreover, it is understood that such a HC decreasing effect is brought by trapping the HC components having C numbers of 3 or more.

Figure 6B:
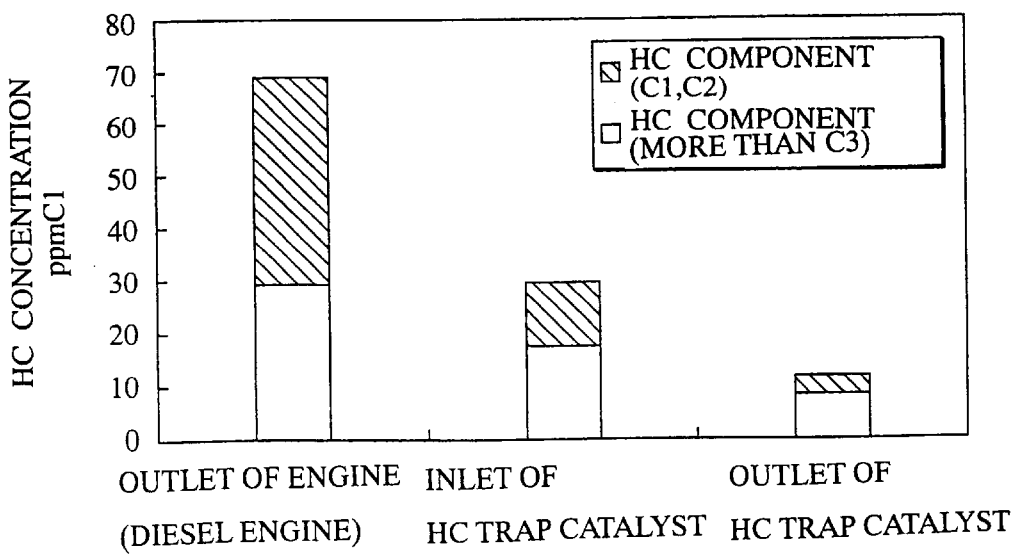
FIG. 6B is a graph showing HC concentration in exhaust gas at each concerned spot when a diesel engine is used.

FIG. 6B shows one example of a HC trap characteristic in the case of using the exhaust gas purifying system of this example in a diesel vehicle. Note that light oil is used as fuel gas here.

In FIG. 6B, HC components that have less than 3 carbon numbers (C numbers) occupy 40% of total HC components, which generated in an internal combustion engine using light oil unlike in the internal combustion engine using gasoline. Also at the inlet to the HC trap catalyst 40, the HC components that have less than 3 carbon numbers occupy 60%. This result is different from the HC components generated in the internal combustion engine using gasoline. Therefore, in the internal combustion engine using light oil as fuel, in order to prevent HC from flowing out in the cold range previously, it will be necessary to decrease the HC components having less than 3 carbon numbers.

Accordingly, in this example, ferrierite which traps the HC components having carbon numbers less than 3 effectively is used as the adsorbent of the HC trap catalyst 40. As a result of this, as shown in FIG. 6B, 50% of HC can be decreased by means of the HC trap catalyst 40. Moreover, it is understood that such a HC decreasing effect is brought by trapping the HC components having less than 3 carbon numbers.

As described above, the HC trap agent of the HC trap catalyst is properly altered depending on the internal combustion engine types, each using the exhaust gas purifying system of the present invention, thus making it possible to prevent HC from flowing out to the atmosphere in the cold range previously.

As described above, according to the present invention, there can be provided the exhaust gas purifying system, in which the hydrogen enriching device is provided upstream of the NOx treating catalyst, and the HC trap catalyst is disposed downstream of the NOx treating catalyst, thus NOx can be efficiently treated by utilizing hydrogen effectively, and the amount of HC flowing out to the atmosphere is decreased.

The entire contents of Japanese Patent Applications P2001-104391 (filed: Apr. 3, 2001) and P2002-068817 (filed: Mar. 13, 2002) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings. The scope of the inventions is defined with reference to the following claims.

What is claimed is:

1. An exhaust gas purifying system for a vehicle, comprising:

a hydrogen enriching device that increases a component ratio of hydrogen with respect to reducing gas components in exhaust gas, the hydrogen enriching device being disposed in an exhaust gas passageway;

a NOx treating catalyst disposed downstream of the hydrogen enriching device in the exhaust gas passageway; and a HC trap catalyst disposed downstream of the NOx treating catalyst in the exhaust gas passageway, wherein the exhaust gas flows from the hydrogen enriching device direct to the NOx treating catalyst continuously during operation and a following condition is satisfied:

$$[H2/TR]d \geq 0.3$$

where $[H2/TR]d$ is a ratio between a hydrogen concentration $[H2]d$ and a total reducing component concentration $[TR]d$ at an inlet to the NOx treating catalyst.

2. The exhaust gas purifying system according to claim 1, wherein the hydrogen enriching device comprises a hydrogen producing device.

3. The exhaust gas purifying system according to claim 1, wherein the hydrogen enriching device comprises a device decreasing reducing components other than hydrogen in the exhaust gas.

4. The exhaust gas purifying system according to claim 1, wherein the hydrogen enriching device comprises a combustion control device that controls at least one of a fuel injection amount, fuel injection timing, ignition timing, open/close timing of intake/exhaust valves of an internal combustion engine to produce hydrogen.

5. The exhaust gas purifying system according to claim 1, wherein the hydrogen enriching device comprises a hydrogen producing catalyst that promotes a reaction producing hydrogen from exhaust gas components.

6. The exhaust gas purifying system according to claim 5, wherein the hydrogen producing catalyst comprises at least one noble metal selected from the group consisting of Pt, Pd and Rh and any mixture thereof.

7. The exhaust gas purifying system according to claim 1, wherein the hydrogen enriching device comprises a HC/CO oxidation catalyst that promotes a reaction of oxidizing one of HC and CO in the exhaust gas.

8. The exhaust gas purifying system according to claim 7, wherein the HC/CO oxidation catalyst comprises a catalyst containing zirconium oxide represented by a following chemical formula (f4):

$$[X]_a Zr_b O_c \quad (f4)$$

where X in the formula is at least one type of alkaline earth metal selected from the group consisting of magnesium, calcium, strontium and barium, a and b are atomic ratios of respective elements, and c is a number of oxygen atoms required for satisfying valences of X and Zr, in which following relations are satisfied: a=0.01 to 0.5; b=0.5 to 0.99; and a=1.

9. The exhaust gas purifying system according to claim 1, wherein the hydrogen enriching device comprises a catalyst containing zirconium oxide represented by a following chemical formula (f5):

$$[Y]_d Zr_e O_f \quad (f5)$$

where Y in the formula is at least one type of element selected from the group consisting of titanium, aluminum, tungsten, molybdenum and zinc, d and e are atomic ratios of respective elements, and f is a number of oxygen atoms required for satisfying valences of Y and Zr, in which following relations are satisfied: d=0.01 to 0.5; e=0.5 to 0.99; and d+e=1.

10. The exhaust gas purifying system according to claim 1, wherein the HC trap catalyst comprises: a hydrocarbon adsorbent layer; and a three-way catalyst layer formed on the hydrocarbon adsorbent layer.

11. The exhaust gas purifying system according to claim 10, wherein the exhaust gas purifying system is one mounted on a gasoline vehicle, and the hydrocarbon adsorbent layer of the HC trap catalyst comprises, as a main component, zeolite that traps mainly hydrocarbon having molecular diameters of 0.4 nm or larger.

12. The exhaust gas purifying system according to claim 11, wherein the zeolite is one of β-zeolite and ZSM-5.

13. The exhaust gas purifying system according to claim 10, wherein the exhaust gas purifying system is one mounted on a diesel vehicle, and the hydrocarbon adsorbent layer of the HC trap catalyst comprises, as a main component, zeolite that traps mainly hydrocarbon having molecular diameters smaller than 0.4 nm.

14. The exhaust gas purifying system according to claim 13, wherein the zeolite is one of ferrierite, A type-zeolite and B-type zeolite.

15. The exhaust gas purifying system according to claim 10, wherein the exhaust gas purifying system is one mounted on a diesel vehicle, the hydrogen enriching device comprises a HC/CO oxidation catalyst that promotes a reaction oxidizing one of HC and CO in the exhaust gas, and the hydrocarbon adsorbent layer of the HC trap catalyst contains, as a main component, zeolite that traps mainly hydrocarbon having molecular diameters smaller than 0.4 nm.

16. The exhaust gas purifying system according to claim 15, wherein the zeolite is one of ferrierite, A type-zeolite and B-type zeolite.

17. The exhaust gas purifying system according to claim 1, wherein a following condition is satisfied:

$$[H2/TR]d > [H2/TR]u$$

where $[H2/TR]u$ is a ratio between a hydrogen concentration $[H2]u$ and a total reducing component concentration $[TR]u$ prior to an execution of hydrogen enriching by the hydrogen enriching device or in the upper stream thereof.

18. The exhaust gas purifying system according to claim 17, wherein a following condition is satisfied:

$$[H2/CO]d > 1$$

where $[H2/CO]d$ is a ratio between the hydrogen concentration $[H2]d$ and a carbon monoxide concentration $[CO]d$ in the total reducing component concentration $[TR]d$ at the inlet to the NOx treating catalyst.

* * * * *